(12) United States Patent
Saito

(10) Patent No.: US 10,152,826 B2
(45) Date of Patent: Dec. 11, 2018

(54) AUGMENTED REALITY DISPLAY SYSTEM, TERMINAL DEVICE AND AUGMENTED REALITY DISPLAY METHOD

(71) Applicant: Panasonic Intellectual Property Management Co., Ltd., Osaka (JP)

(72) Inventor: Hiroshi Saito, Osaka (JP)

(73) Assignee: Panasonic Intellectual Property Mangement Co., Ltd., Osaka (JP)

(*) Notice: Subject to any disclaimer, the term of this patent is extended or adjusted under 35 U.S.C. 154(b) by 0 days.

(21) Appl. No.: 15/408,605

(22) Filed: Jan. 18, 2017

(65) Prior Publication Data

US 2017/0124769 A1    May 4, 2017

Related U.S. Application Data

(63) Continuation of application No. PCT/JP2015/003688, filed on Jul. 23, 2015.

(30) Foreign Application Priority Data

Jul. 28, 2014 (JP) ................................. 2014-152553

(51) Int. Cl.
*G09G 5/00* (2006.01)
*G06T 19/00* (2011.01)
(Continued)

(52) U.S. Cl.
CPC ............ *G06T 19/006* (2013.01); *G06F 3/011* (2013.01); *G06F 3/048* (2013.01); *H04N 5/225* (2013.01);
(Continued)

(58) Field of Classification Search
None
See application file for complete search history.

(56) References Cited

U.S. PATENT DOCUMENTS 5,745,126 A * 4/1998 Jain .......................... H04N 5/77
348/42
7,091,989 B2 * 8/2006 Gibbs ..................... G09G 5/026
345/589

(Continued)

FOREIGN PATENT DOCUMENTS

| JP | 2003-204481 | 7/2003 |
| JP | 2003-281504 | 10/2003 |
| JP | 2013-025326 | 2/2013 |

OTHER PUBLICATIONS

International Search Report of PCT application No. PCT/JP2015/003688 dated Sep. 1, 2015.
(Continued)

*Primary Examiner* — David H Chu
(74) *Attorney, Agent, or Firm* — McDermott Will & Emery LLP

(57) ABSTRACT

An augmented reality display system includes: a data producing system that produces position information of an object; a cloud server that receives the position information produced by the data producing system; and a terminal device connectable to the cloud server through a network. The terminal device includes: an imaging unit that produces an image data; a camera attitude estimating unit that estimates an attitude of the imaging unit from the image data; a data receiving unit that receives a content and the position information regarding the content from the cloud server; a data overlaying unit that transforms the position information correspondingly to the attitude of the imaging unit estimated by the camera attitude estimating unit, and overlays the content on the image data based on a reference position indicated by the transformed position information to obtain an overlay image data; and a display unit that displays the overlay image data.

11 Claims, 7 Drawing Sheets

(51) Int. Cl.
*G06F 3/048* (2013.01)
*H04N 5/225* (2006.01)
*H04N 5/232* (2006.01)
*H04N 5/247* (2006.01)
*G06F 3/01* (2006.01)
*H04N 5/265* (2006.01)
*H04N 21/414* (2011.01)
*H04N 21/4223* (2011.01)
*H04N 21/45* (2011.01)
*H04N 21/4722* (2011.01)
*H04N 21/658* (2011.01)
*H04N 21/81* (2011.01)

(52) U.S. Cl.
CPC ......... *H04N 5/232* (2013.01); *H04N 5/23238* (2013.01); *H04N 5/247* (2013.01); *H04N 5/265* (2013.01); *H04N 21/41407* (2013.01); *H04N 21/4223* (2013.01); *H04N 21/4524* (2013.01); *H04N 21/4722* (2013.01); *H04N 21/6582* (2013.01); *H04N 21/8133* (2013.01)

(56) References Cited

U.S. PATENT DOCUMENTS

| | | | |
|---|---|---|---|
| 7,173,672 B2 * | 2/2007 | Gibbs | H04N 5/2224 345/632 |
| 7,796,155 B1 * | 9/2010 | Neely, III | G06K 9/00771 345/418 |
| 8,284,238 B2 * | 10/2012 | Stone | G06T 7/536 348/46 |
| 2003/0080978 A1 * | 5/2003 | Navab | G01S 5/16 345/633 |
| 2007/0035562 A1 * | 2/2007 | Azuma | G03B 13/28 345/633 |
| 2007/0279494 A1 * | 12/2007 | Aman | G01S 3/7864 348/169 |
| 2008/0291272 A1 * | 11/2008 | Krahnstoever | G06T 7/246 348/143 |
| 2010/0321389 A1 * | 12/2010 | Gay | G11B 27/036 345/427 |
| 2011/0238762 A1 * | 9/2011 | Soni | G01C 21/3679 709/206 |
| 2012/0249831 A1 * | 10/2012 | Porter | H04N 5/23206 348/231.3 |
| 2012/0254369 A1 | 10/2012 | Gillard et al. | |
| 2013/0002649 A1 * | 1/2013 | Wu | G06T 19/006 345/419 |
| 2013/0201201 A1 * | 8/2013 | Morinaga | G09G 5/02 345/589 |
| 2014/0340423 A1 * | 11/2014 | Taylor | A63F 13/655 345/633 |
| 2015/0084951 A1 * | 3/2015 | Boivin | H04N 5/272 345/419 |
| 2015/0131845 A1 * | 5/2015 | Forouhar | G06K 9/00724 382/100 |
| 2016/0375340 A1 * | 12/2016 | Monari | A63B 71/06 345/474 |
| 2017/0310900 A1 * | 10/2017 | Inoue | H04N 5/23293 |

OTHER PUBLICATIONS

The Extended European Search Report dated Jul. 6, 2017 for the related European Patent Application No. 15826993.6.

* cited by examiner

FIG. 4

| Accompanying information A | AA*** | | AB*** | | BA*** | | Ball | | |
|---|---|---|---|---|---|---|---|---|---|
| Accompanying information B | 10 | | 6 | | 11 | | | | |
| Accompanying information C | MF | | DF | | FW | | | | |
| ... | ... | | ... | | ... | | ... | | |
| Position coordinates | x | y | x | y | x | y | x | y | z |
| Frame 1 | 72 | 32 | 323 | 152 | 223 | 32 | 323 | 32 | 0 |
| Frame 2 | 77 | 37 | 323 | 152 | 223 | 32 | 328 | 37 | 0 |
| Frame 3 | 82 | 42 | 324 | 150 | 224 | 30 | 333 | 42 | 1 |
| Frame 4 | 87 | 47 | 324 | 150 | 224 | 30 | 338 | 47 | 2 |
| Frame 5 | 92 | 52 | 326 | 152 | 226 | 32 | 343 | 52 | 3 |
| Frame 6 | 97 | 57 | 328 | 154 | 228 | 34 | 348 | 57 | 4 |
| Frame 7 | 102 | 62 | 330 | 154 | 228 | 33 | 353 | 62 | 5 |
| Frame 8 | 107 | 67 | 334 | 154 | 228 | 34 | 358 | 67 | 3 |
| Frame 9 | 112 | 72 | 346 | 154 | 229 | 34 | 363 | 72 | 1 |
| ... | ... | ... | ... | ... | ... | ... | ... | ... | ... |

AUGMENTED REALITY DISPLAY SYSTEM, TERMINAL DEVICE AND AUGMENTED REALITY DISPLAY METHOD

BACKGROUND

1. Technical Field

The present disclosure relates to an augmented reality display system, which overlays a content on an image taken by an imaging device.

2. Description of the Related Art

In recent years, augmented reality has been known as a technology for presenting an image taken by a camera (a real-world environment) after adding other information such as characters, images, or the like to the image (see, for example, PTL1).

CITATION LIST

Patent Literature

PTL 1: Unexamined Japanese Patent Publication No. 2013-25326

SUMMARY

The present disclosure provides an augmented reality display system that is capable of simultaneously overlaying a useful content on each of images which are respectively taken by a plurality of users.

An augmented reality display system includes: a data producing system that produces position information of an object; a cloud server that receives the position information produced by the data producing system; and a terminal device connectable to the cloud server through a network. The terminal device includes: an imaging unit that produces an image data; a camera attitude estimating unit that estimates an attitude of the imaging unit from the image data; a data receiving unit that receives a content and the position information regarding the content from the cloud server; a data overlaying unit that transforms the position information correspondingly to the attitude of the imaging unit estimated by the camera attitude estimating unit, and overlays the content on the image data based on a reference position indicated by the transformed position information to obtain an overlay image data; and a display unit that displays the overlay image data.

The augmented reality display system in accordance with the present disclosure is capable of simultaneously overlaying a useful content on each of images which are respectively taken by a plurality of users.

BRIEF DESCRIPTION OF DRAWINGS

FIG. 4 is a diagram showing position coordinates and contents data of objects stored in a cloud server in accordance with the first exemplary embodiment.

DETAILED DESCRIPTION

Hereinafter, exemplary embodiments will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the description. Also, it should be noted that the following description and the accompanying drawings are provided to allow any person skilled in the art to fully understand the present disclosure, and that it is not intended to limit the subject matter described in the claims by the following description.

First Exemplary Embodiment

1. Configuration

Figure 1:
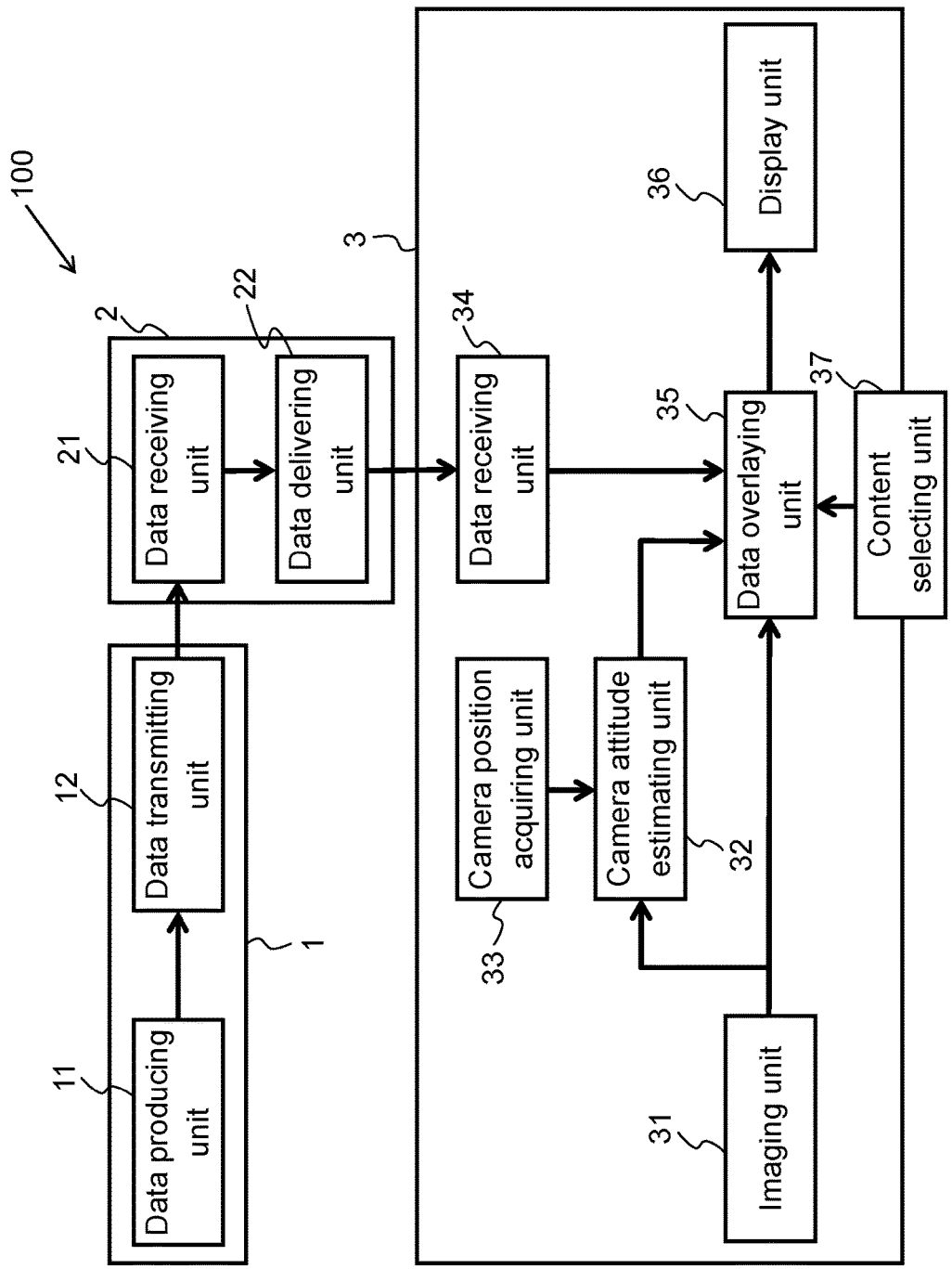
FIG. 1 is a schematic diagram illustrating a configuration of an augmented reality display system in accordance with a first exemplary embodiment.

FIG. 1 is a schematic diagram illustrating a configuration of augmented reality display system 100 in accordance with a first exemplary embodiment. Augmented reality display system 100 is capable of realizing an overlay display of a content on an appropriate position in a live-action image taken by imaging unit 31 of terminal device 3. Structural components of augmented reality display system 100 shown in FIG. 1 include wide camera system 1, cloud server 2, and terminal device 3 which is connectable to cloud server 2 through a network.

Wide camera system 1 includes a plurality of cameras. Wide camera system 1 can produce a synthetic panoramic image based on images obtained by shooting an event site such, for example, as a sports stadium or an event hall, and provide the produced panoramic image. Wide camera system 1 also has a function of calculating a position coordinate as position information of an object (e.g., a player or a ball in the sports stadium) on the synthetic panoramic image by an image analysis, and can track the position coordinate of the object on the synthetic panoramic image. Wide camera system 1 has data producing unit 11 that produces data regarding the object including the position coordinate of the tracked object, and data transmitting unit 12 that transmits the data produced by data producing unit 11 to cloud server 2 through a wired line or a wireless line. Wide camera system 1 is an example of the data producing system.

Cloud server 2 has data receiving unit 21 that receives the data transmitted from data transmitting unit 12 of wide camera system 1, and data delivering unit 22 that delivers the received data and a data regarding a content which can be overlaid.

Figure 2:
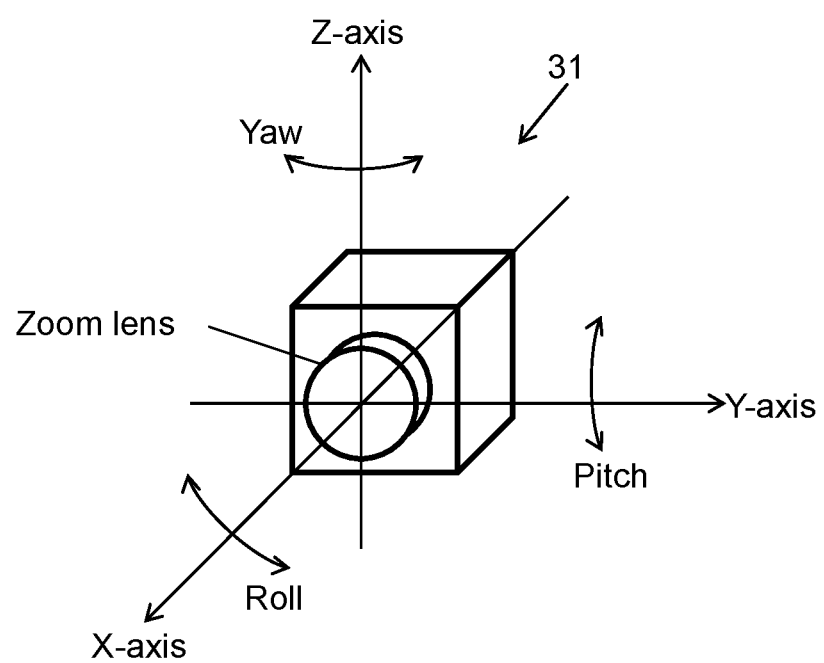
FIG. 2 is a schematic diagram for explaining an attitude of an imaging unit in accordance with the first exemplary embodiment.

Terminal device 3 is a device acting as a viewer for displaying augmented reality, and includes imaging unit 31 (a camera) that produces an image data, and camera attitude estimating unit 32 that estimates an attitude of imaging unit 31 from the image data. Camera attitude estimating unit 32 estimates the attitude of imaging unit 31 from the image data based on seven parameters including three coordinates (x, y, z), three rotational angles (a roll angle, a pitch angle, and a yaw angle) and a focal length of a lens (a zoom position) of imaging unit 31 as shown in FIG. 2.

Specifically, in a case of watching a live soccer match in a soccer stadium, for example, an audience uses imaging unit 31 of terminal device 3 to shoot the soccer match. In a case where the image taken by imaging unit 31 contains a line of the pitch (the field) in the soccer stadium, camera attitude estimating unit 31 estimates the attitude of imaging unit 31 by a projection transformation using the line as a kind of marker, because the length or the size of the line is known. This allows camera attitude estimating unit 32 to estimate from the image the attitude of imaging unit 31 defined by seven parameters including three coordinates (x, y, z), three rotational angles (a roll angle, a pitch angle, and a yaw angle) and a focal length of the lens.

Although camera attitude estimating unit 32 uses the known line of the soccer field as a marker in the present exemplary embodiment, an appropriate object usable as a marker may be disposed in the stadium such as the soccer stadium or the like to more accurately estimate the attitude of imaging unit 31 from the image. Also, the information such as the length of the line or the like in the sports field may be included in the data delivered from cloud server 2 to terminal device 3.

Also, terminal device 3 additionally has camera position acquiring unit 33 such as a GPS (Global Positioning System) receiver for recognizing the attitude of the camera based on a symmetric figure like the pitch in the soccer stadium. Because, in a case where the marker is a symmetric figure like the line indicating the pitch in the soccer stadium, it cannot be accurately determined solely from the figure on which side of the pitch imaging unit 31 is located. Camera position acquiring unit 33 acquires position information of imaging unit 31. The acquired position information is input to camera attitude estimating unit 32. Accordingly, camera attitude estimating unit 32 can roughly determine on which side of the pitch in the soccer stadium the audience carrying terminal device 3 is located, and can estimate the attitude of imaging unit 31 even from the symmetric figure by using this determined information.

Also, terminal device 3 includes data receiving unit 34, data overlaying unit 35, and display unit 36. Data receiving unit 34 receives, from data delivering unit 22 of cloud server 2, data including a content (e.g., player's accompanying information such, for example, as a player's uniform number and a player's name) which can be overlaid on an image taken by imaging unit 31 and position coordinates of a player. Data overlaying unit 35 appropriately overlays the content such, for example, as the player's name on the image data produced by the imaging unit 31 according to the camera attitude estimated by camera attitude estimating unit 32. Display unit 36 displays the image on which the content is overlaid.

Further, terminal device 3 includes content selecting unit 37 that selects whether or not to permit overlaying each of contents delivered by cloud server 2.

2. Operations

Figure 3:
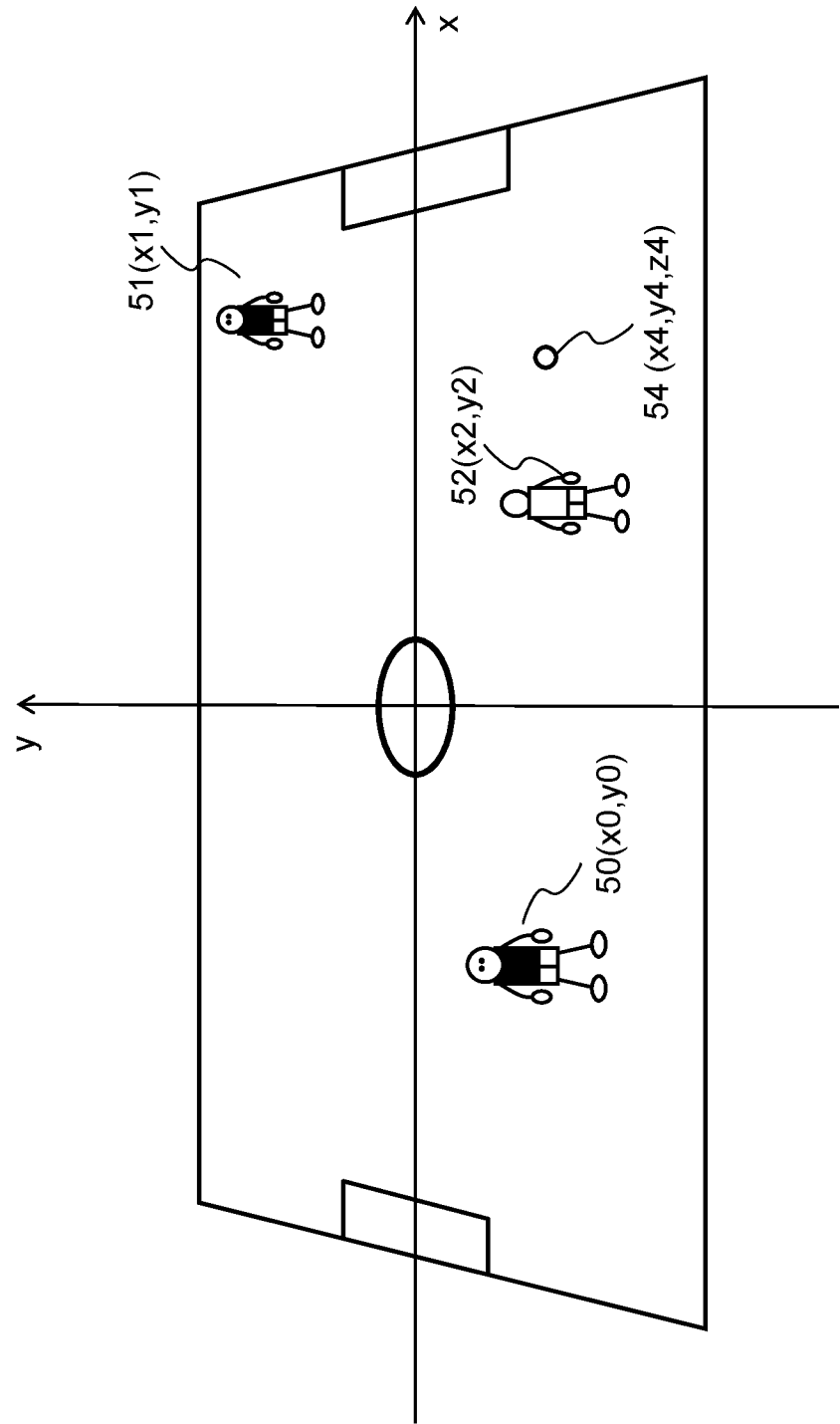
FIG. 3 is a full view of a pitch in a soccer stadium taken by a wide camera system in accordance with the first exemplary embodiment.

Operations of augmented reality display system 100 configured as above will hereinafter be described, taking a soccer stadium as an example. FIG. 3 is a full view of a pitch in a soccer stadium taken by wide camera system 1. Wide camera system 1 includes a plurality of cameras to produce a synthetic panoramic image of the pitch in the soccer stadium as shown in FIG. 3. FIG. 3 shows, for convenience, three players including players 50 and 51 of one team (offending to the left) and player 52 of the other team (offending to the right), and ball 54. Wide camera system 1 shoots these players and the ball, as objects.

Wide camera system 1 tracks players of each team and the ball by a tracking function using an image analysis, and produces data indicating motions of the objects as position coordinates (x, y, z coordinates) in each frame. If the object is a player, the player may, in some case, be identified by reading the player's uniform number. If the object is a ball, the ball may be identified by reading its shape and movement. The data including the produced information (e.g., the uniform number) for identifying the object (e.g., the player) and the position coordinates of the object are transmitted to cloud server 2.

Cloud server 2 receives by data receiving unit 21 the data including the information for identifying the object and the position coordinates transmitted from wide camera system 1. Cloud server 2 stores these received data, which have been produced on a frame by frame basis, in association with the pieces of accompanying information (e.g., the name, the uniform number and the position of each player), which become the overlayable contents. An example of such data storage is shown in FIG. 4. Referring to FIG. 4, data stored in accompanying information A are names of the objects (names of the players as "AA***" and the like and "ball"). Data stored in accompanying information B are uniform numbers of the players, and data stored in accompanying information C are positions of the players. If corresponding accompanying information does not exist, as in the case that the object is the ball, accompanying information is not stored. Also, position coordinates are stored on a frame by frame basis in association with these pieces of accompanying information. The kinds of the accompanying information are not limited to the above contents, but may be appropriately changed depending on the kind of sports or the like.

In the present exemplary embodiment, a soccer stadium is taken as an example. Accordingly, if the object is a player, the position coordinates of the player to be stored are only the x and y coordinates, because movement of the player in the z-direction (vertical direction) may be regarded as negligible. However, the z coordinate may also be stored. If the object is the ball, on the other hand, all of the x, y and z coordinates are stored without neglecting movement in the z-direction. The position coordinates of the ball can be used to display a trajectory of the ball as an overlaid content on terminal device 3.

In the present exemplary embodiment, cloud server 2 delivers, with data delivering unit 22, the stored data including the overlayable contents, such, for example, as the accompanying information and the position coordinates of the objects (the players or the like) to terminal device 3 at predetermined timings.

An audience, who is a user of terminal device 3, may operate content selecting unit 37 to select any content in accordance with his/her taste among the various overlayable contents and to overlay only a content the audience thinks necessary.

Augmented reality display system 100 can overlay various contents. Two examples of overlaying a content will be described below as typical examples. It is of course possible to simultaneously overlay a plurality of contents by operating content selecting unit 37.

2-1. Example of Overlaying an Offside Line

Figure 5:
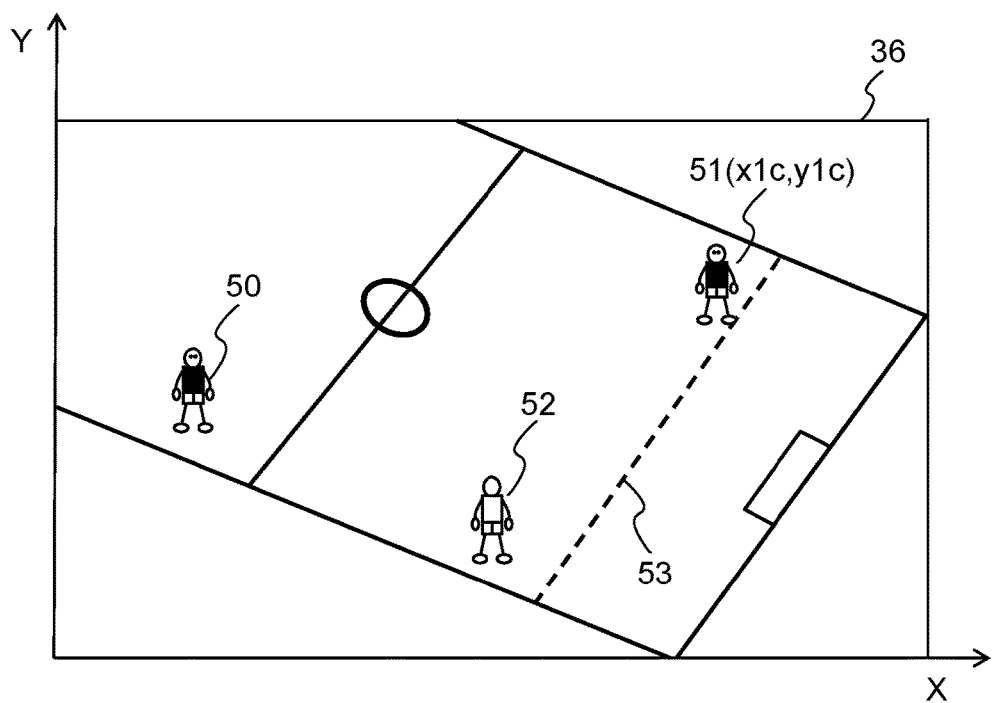
FIG. 5 is a diagram for explaining a display example 5 on a display unit in accordance with the first exemplary embodiment.

Referring to FIG. 3, in which the position coordinates of player 51 are (x1, y1), offside line 53 beginning at player 51 can be set if the x coordinate of player 51 (x1) is larger than any of x coordinates of other players (e.g., x0 of player 50) except for the goal keeper of the player 51's own team. FIG. 5 shows a display example on display unit 36 in which offside line 53 is overlaid on an image taken by imaging unit 31 of terminal device 3.

Wide camera system 1 produces, by an image analysis, the data including information (e.g., a uniform number) for identifying each object (each player) and a position coordinate of the object, and transmits the produced data to cloud server 2. Cloud server 2 stores the received data in association with the uniform number of each player, and produces offside line information, which becomes a content, by using the position coordinate of each player. In other words, cloud server 2 can identify a player who has a largest (or smallest) value of x coordinate among the players of the identified-player's own team in the pitch except for the goal keeper from the received position coordinates and the positions indicated by accompanying information C, and can produce offside line information based on the x coordinate of the identified player. Like this, offside line 53 is a content which is produced based on the position coordinates of a plurality of objects. As another manner, terminal device 3 may receive the position coordinates of the plurality of objects from cloud server 2, and produce the offside line information at the terminal device end.

Data delivering unit 22 of cloud server 2 delivers data including the accompanying information (the uniform numbers, names, and positions of the players), the position coordinates of the players, and the offside line information, to data receiving unit 34 of terminal device 3 continuously at predetermined timings.

In a case where offside line 53 is permitted as a content to be overlaid by an operation of content selecting unit 37, data overlaying unit 35 overlays the offside line information received by data receiving unit 34 on an image data produced by imaging unit 31, and sends the resultant data to display unit 36.

Position coordinates (x1, y1) of player 51 shown in FIG. 3 correspond to position coordinates (x1c, y1c) in the image displayed on display unit 36 shown in FIG. 5. Data overlaying unit 35 performs a coordinate transform processing to calculate, from the received position coordinates (x1, y1), position coordinates (x1c, y1c) of the image of player 51 taken by imaging unit 31 as shown in FIG. 5. Then, data overlaying unit 35 overlays offside line 53 on the image taken by imaging unit 31 based on position coordinates (x1c, y1c) as a reference position so that the overlay image is displayed by display unit 36.

Incidentally, offside line 53 is not overlaid if the camera attitude is such that imaging unit 31 carried by the audience is not shooting the area covering player 51 or offside line 53.

2-2. Example of Overlaying Accompanying Information

As described above, data delivering unit 22 of cloud server 2 delivers to data receiving unit 34 of terminal device 3 the data including the pieces of accompanying information such, for example, as the uniform numbers, names and positions of the players, which become contents to be overlaid, and also including the position coordinates of the players. Data overlaying unit 35 of terminal device 3 performs a coordinate transform processing to calculate position coordinates of the images of players 50, 51 and 52 taken by imaging unit 31 from the position coordinates of players 50, 51 and 52, respectively, produced by wide camera system 1.

Then, in a case where the accompanying information of each player is permitted as a content to be overlaid by content selecting unit 37, data overlaying unit 35 overlays the accompanying information of players 50, 51 and 52 taken by imaging unit 31 on the image taken by imaging unit 31 in areas beginning at the position coordinates of players 50, 51 and 52, respectively, and this overlaid image can be displayed by display unit 36. In this manner, in a case where imaging unit 31 carried by an audience is in a position of catching player 51, terminal device 3 can display, as overlaid contents, the player's uniform number, name and position by display unit 36, as shown in FIG. 6A.

Figure 6A:
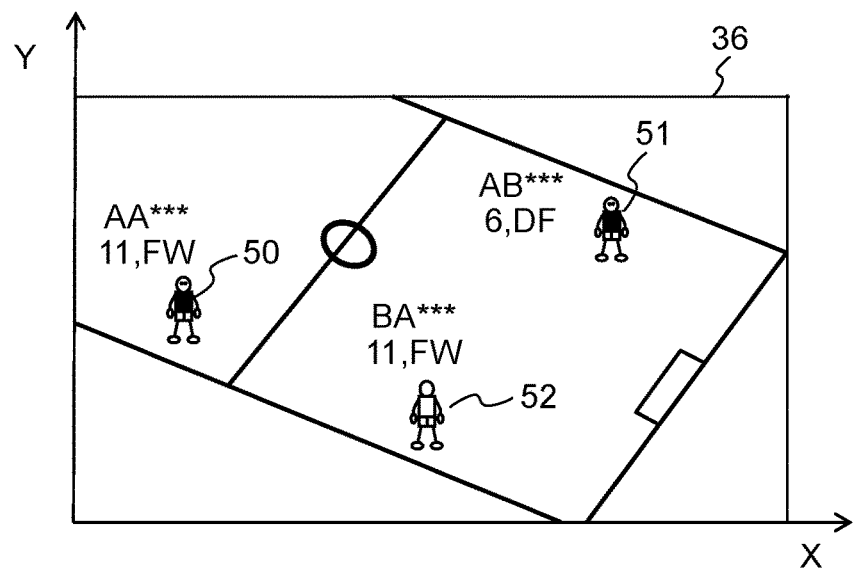
FIG. 6A is a diagram for explaining a display example 6A on the display unit in accordance with the first exemplary embodiment.
Figure 6B:
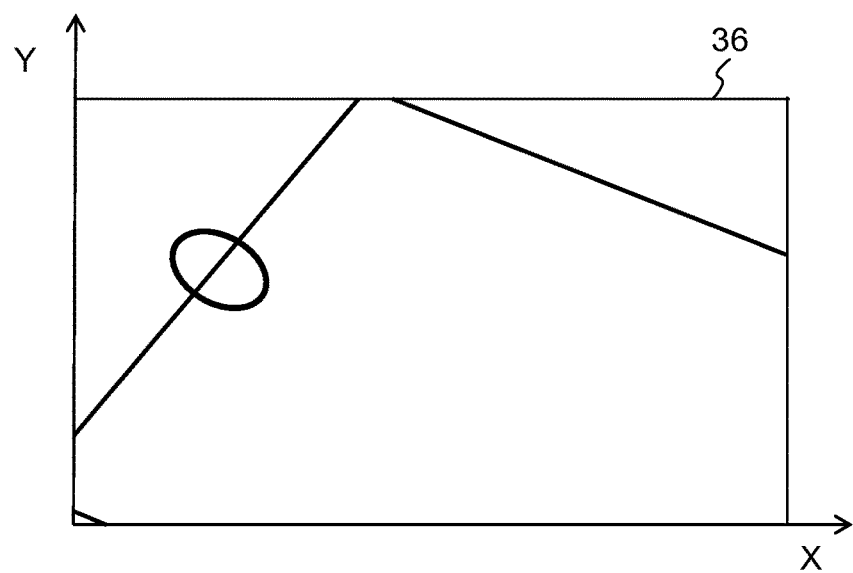
FIG. 6B is a diagram for explaining a display example 6B on the display unit in accordance with the first exemplary embodiment.

In a case where the focal length of the lens of imaging unit 31 is shifted toward the telephoto end compared to the case shown in FIG. 6A and thus player 51 is not taken by imaging unit 31 to be within the displayed area of display unit 36, the accompanying information such as the player's name or the like is not overlaid as shown in FIG. 6B.

As described hereinbefore, even when the marker is a symmetric figure like a line in a sports field, augmented reality display system 100 can use an approximate position of a camera (imaging unit 31) obtained by camera position acquiring unit 33 to overlay a content such as a player's name or the like on an appropriate position in a real-world image by applying the AR technology. The overlayable contents include, for example, not only the names, uniform numbers and positions of the players in a soccer match as exemplified in the present exemplary embodiment, but also information associated with each individual player such, for example, as a running distance and a running speed, formation information such, for example, as an offside line, and, in a case of a track and field event, a trajectory and a flying distance of a discus or a javelin in a field throwing event.

Second Exemplary Embodiment

Figure 7:
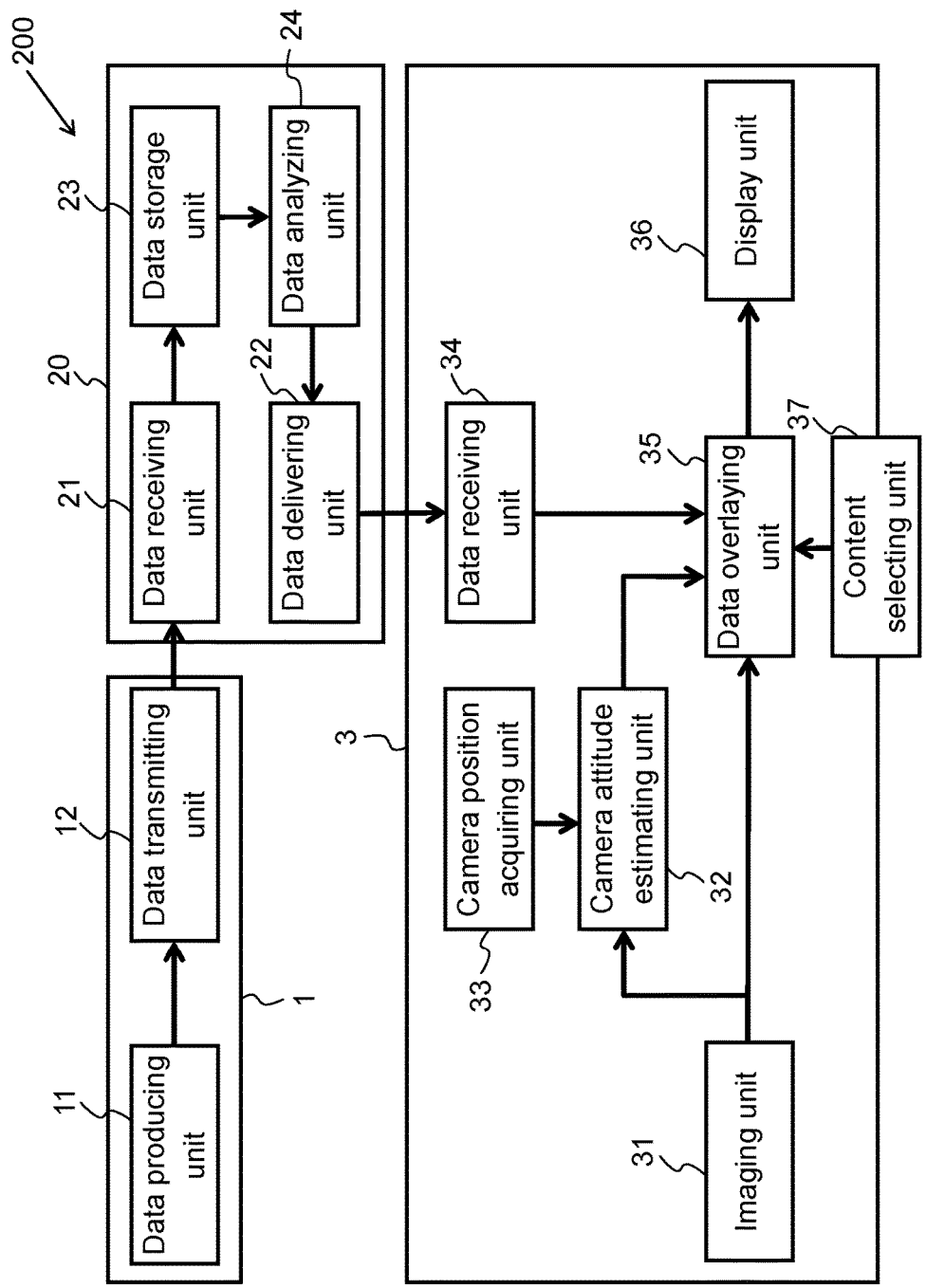
FIG. 7 is a schematic diagram illustrating a configuration of an augmented reality display system in accordance with a second exemplary embodiment.

FIG. 7 is a schematic diagram illustrating a configuration of augmented reality display system 200 in accordance with a second exemplary embodiment. The configuration shown in FIG. 7 is different from that shown in FIG. 1 in the internal configuration of cloud server 20. That is, as shown in FIG. 7, cloud server 20 additionally has data storage unit 23 that stores data, and data analyzing unit 24 that analyzes the data stored in data storage unit 23, compared to cloud server 2 shown in FIG. 1.

In the configuration of augmented reality display system 100 shown in FIG. 1, the data regarding an object is produced by using the live image taken by wide camera system 1, and the content to be overlaid is produced by using the produced data. On the other hand, in augmented reality display system 200 shown in FIG. 10, image data which were taken in the past are stored in data storage unit 23, and data analyzing unit 24 can produce a content data using the stored image data.

For example, in a case where an audience using terminal device 3 is watching a 100-meter sprint in a track and field event, augmented reality display system 100 described in the first exemplary embodiment can display accompanying information (e.g., name) of a sprinter overlaid on an image of the sprinter being taken by imaging unit 31. On the other hand, augmented reality display system 200 in accordance with the present exemplary embodiment can store, for example, a trajectory of a world record in the 100-meter sprint in data storage unit 23. Accordingly, a trajectory line of the world record can be displayed as a content overlaid on an image of the 100-meter sprint taken in real time by imaging unit 31. In this case, instead of displaying the trajectory line of the world record, a virtual sprinter may be graphically displayed on display unit 36 such that the virtual sprinter is running to track the world record trajectory side-by-side with the actually running sprinters being taken by imaging unit 31.

Advantageous Effects and so on

According to the present exemplary embodiment, as described hereinbefore, each of augmented reality display systems 100 and 200 includes: wide camera system 1 that produces position information of an object; cloud server 2 that receives the position information produced by wide camera system 1; and terminal device 3 connectable to cloud server 2 through a network. Terminal device 3 includes: imaging unit 31 that produces an image data, camera attitude estimating unit 32 that estimates an attitude of imaging unit 31 from the image data; data receiving unit 34 that receives a content and position information regarding the content from cloud server 2; data overlaying unit 35 that transforms the position information correspondingly to the attitude of imaging unit 31 estimated by camera attitude estimating unit 32, and overlays the content on the image data based on a reference position indicated by the transformed position information to obtain an overlay image data; and display unit 36 that displays the overlay image data.

With this configuration, in a case, for example, of watching a live sports event in a sports stadium, it is possible to overlay a content on an appropriate position in an image displayed by each of a plurality of terminal devices 3 used by a plurality of audiences according to a camera position of corresponding one of terminal devices 3. In this manner, each of augmented reality display systems 100 and 200 is capable of simultaneously displaying overlaid useful contents on a plurality of terminal devices 3 so as to correspond to their respective camera positions.

Also, terminal device 3 has camera position acquiring unit 33 that acquires position information of terminal device 3. From this position information, camera attitude estimating unit 32 can roughly determine on which side of the pitch in the soccer stadium or the like the audience carrying terminal device 3 is, and can estimate the camera attitude by using this determined information even if the marker is a symmetric figure.

Also, terminal device 3 has content selecting unit 37 for the user to select whether or not to permit overlaying each content among the contents delivered by cloud server 2. Accordingly, the audience, who is the user of terminal device 3, can operate content selecting unit 37 to select and overlay such a content that the audience considers necessary among the various overlayable contents.

It has been described, in the present exemplary embodiment, that data producing unit 11 includes a camera, and produces a data regarding an object by an image analysis. However, such data may be produced by a sensor.

Also, as in the case of augmented reality display system 200, cloud server 20 configured as shown in FIG. 7 makes it possible to produce a content to be overlaid by using both a data based on a live image taken by wide camera system 1 and past recorded data.

INDUSTRIAL APPLICABILITY

The present disclosure is applicable to an augmented reality display system in various sports stadiums or various event sites such, for example, as, event halls.

What is claimed is:

1. An augmented reality display system comprising:
a data producing system that produces first position coordinates of an object;
a cloud server that receives the first position coordinates produced by the data producing system; and
a terminal device connectable to the cloud server through a network, wherein
the terminal device includes:
an imaging unit that produces image data including an image of the object and a marker based on which second position coordinates of the object in the image data are determined;
a camera attitude estimating unit that estimates an attitude of the imaging unit from the image data, and determines the second coordinates of the object in the image data based on the marker;
a data receiving unit that receives the first position coordinates of the object and a content associated with the first position coordinates from the cloud server;
a data overlaying unit that transforms the received first position coordinates of the object to the second position coordinates of the object in the image data based on the estimated attitude of the imaging unit, and overlays the content on the image data based on the transformed position coordinates to obtain overlay image data; and
a display unit that displays the overlay image data.

2. The augmented reality display system according to claim 1, wherein the cloud server delivers the content and updated position coordinates to the terminal device.

3. The augmented reality display system according to claim 1, wherein the content is produced based on the first position coordinates of each of a plurality of objects.

4. The augmented reality display system according to claim 1, wherein the content is accompanying information related to the object.

5. The augmented reality display system according to claim 1, wherein the data producing system is a camera system having a function of tracking an object by an image analysis.

6. The augmented reality display system according to claim 1, wherein the camera attitude estimating unit estimates the attitude of the imaging unit from the image data based on seven parameters including three coordinates (x, y, z), three rotational angles (a roll angle, a pitch angle, and a yaw angle) and a focal length of a lens of the imaging unit.

7. The augmented reality display system according to claim 1, wherein the terminal device has a camera position acquiring unit that acquires position of the imaging unit, and wherein the position of the imaging unit is input to the camera attitude estimating unit.

8. The augmented reality display system according to claim 1, wherein the terminal device has a content selecting unit that selects whether or not to permit overlaying each content among contents delivered by the cloud server.

9. The augmented reality display system according to claim 1, wherein the cloud server includes a data storage unit that stores the data, and a data analyzing unit that analyzes the data stored in the data storage unit.

10. A terminal device used in an augmented reality display system, the terminal device comprising:
an imaging unit that produces image data including an image of an object and a marker based on which first position coordinates of the object in the image data are determined;

a camera attitude estimating unit that estimates an attitude of the imaging unit from the image data, and determines the first position coordinates of the object in the image data based on the marker;

a data receiving unit that receives second position coordinates of the object and a content associated with second position coordinates from a cloud server;

a data overlaying unit that transforms the received second position coordinates of the object to the first position coordinates of the object in the image data based on the estimated attitude of the imaging unit, and overlays the content on the image data based on the transformed position coordinates to obtain overlay image data; and a display unit that displays the overlay image data.

11. An augmented reality display method comprising:

producing image data of the object by an imaging unit, the image data including an image of the object and a marker based on which first position coordinates of the object in the image data are determined;

estimating from the image data an attitude of the imaging unit;

determining the first coordinates of the object in the image data based on the marker;

receiving second position coordinates of the object and a content associated with the second position coordinates from a cloud server;

transforming the received second position coordinates of the object to the first position coordinates of the object in the image data based on the estimated attitude of the imaging unit;

overlaying the content on the image data based on the transformed position coordinates to obtain overlay image data; and displaying the overlay image data.

* * * * *